United States Patent Office 3,021,891
Patented Feb. 20, 1962

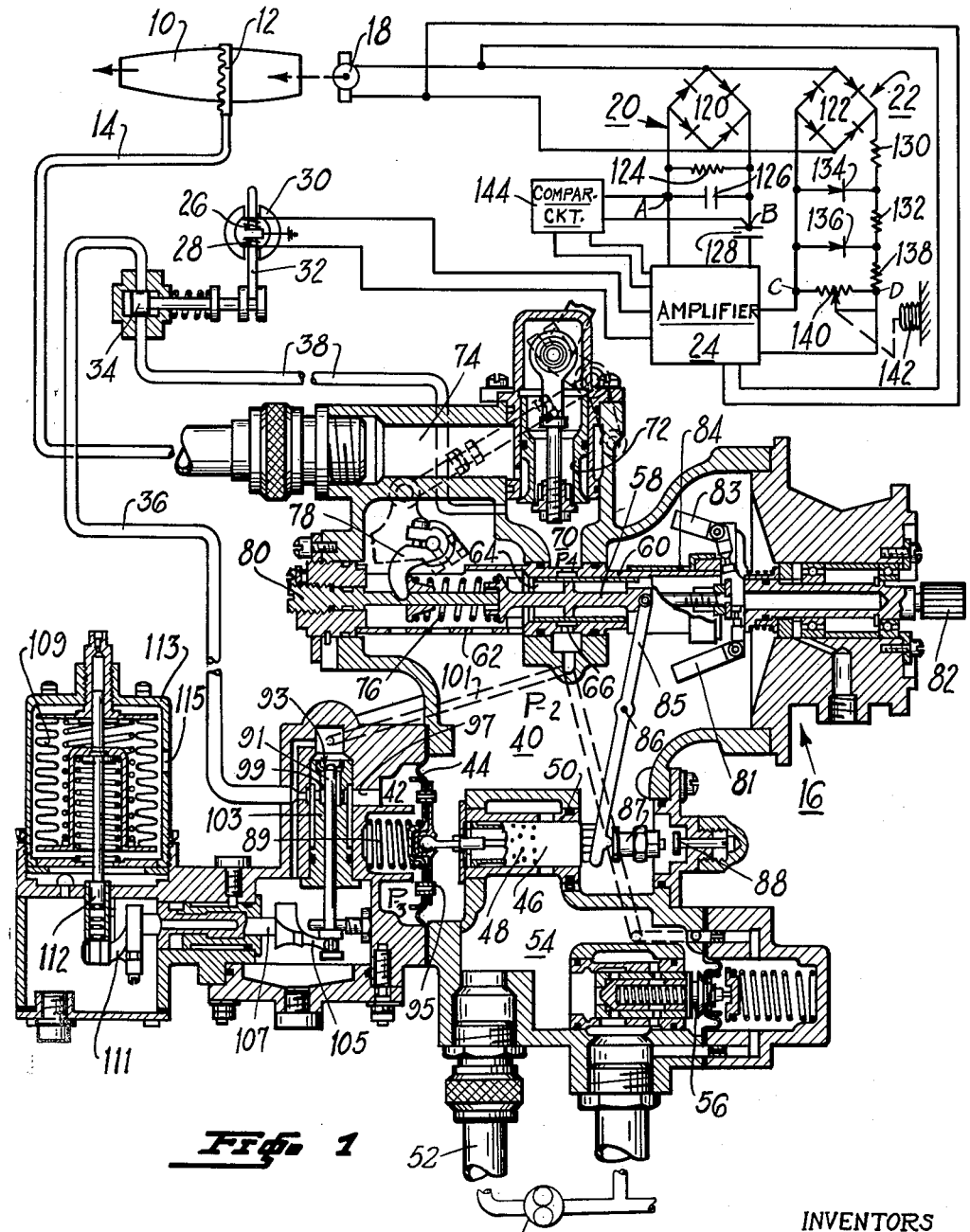

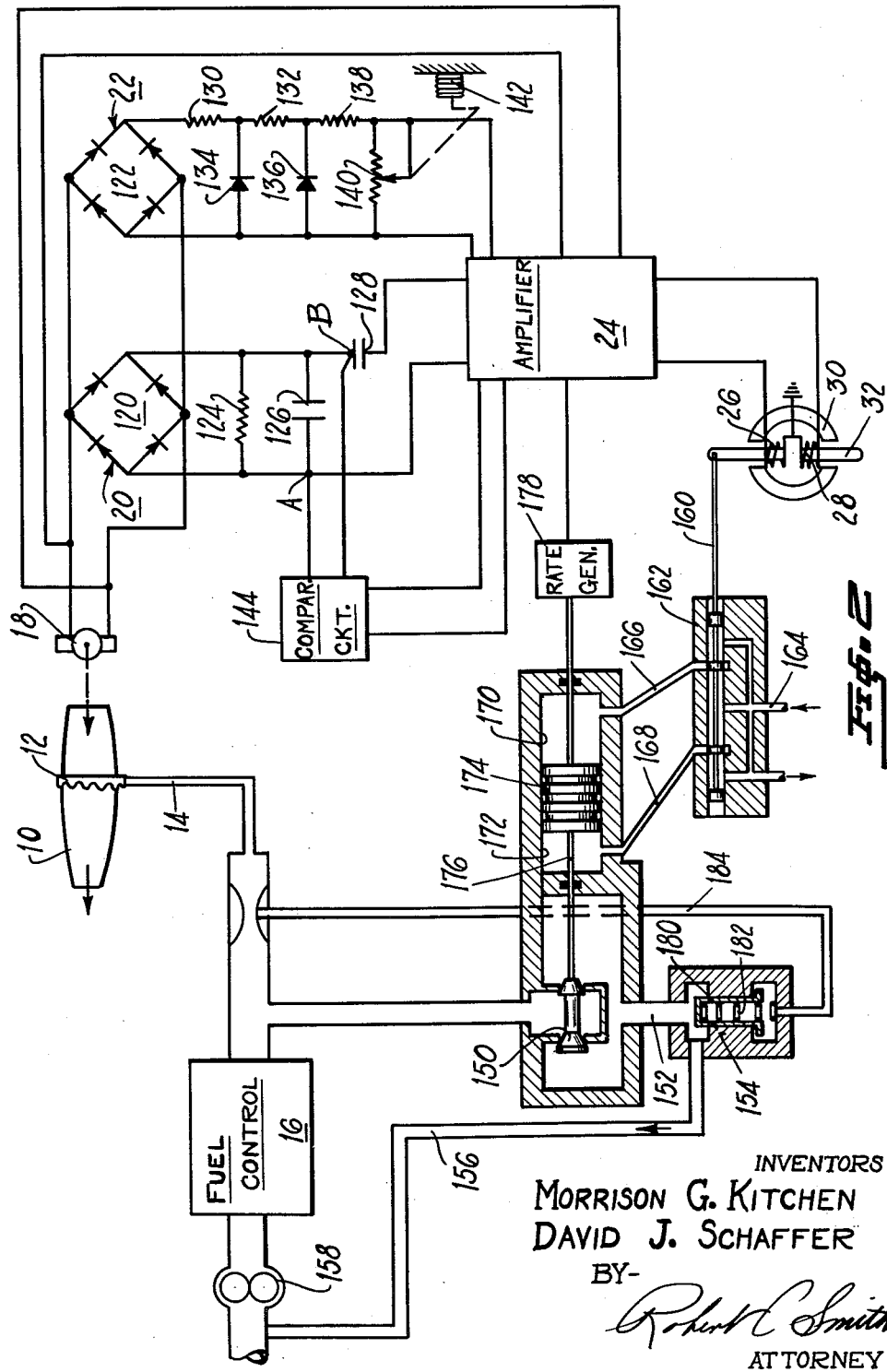

3,021,891
ACCELERATION LIMITING DEVICE FOR USE WITH HYDRO-MECHANICAL FUEL METERING SYSTEMS
Morrison G. Kitchen and David J. Schaffer, South Bend, Ind., assignors to The Bendix Corporation, South Bend, Ind., a corporation of Delaware
Filed Feb. 24, 1956, Ser. No. 567,639
18 Claims. (Cl. 158—36.4)

This invention relates to gas turbine engine fuel systems and in particular to a device for modifying the amount of metered fuel delivered to a gas turbine engine during transient conditions so that compressor stall may be avoided.

During an acceleration, a gas turbine engine must be supplied with an excess of fuel over the amount necessary to maintain a constant speed, but this excess must not be permitted to become so great as to cause the engine to exceed certain operating limits. One of these limits is engine operating temperature and this factor may be held to safe values by a mechanical scheduling arrangement. Over a portion of the acceleration range, however, temperature becomes a less severe limiting factor than compressor stall and any engine control which is to schedule fuel to a modern engine must take this limitation into consideration. In hydro-mechanical fuel control systems produced in volume, it has often been the practice to design a fuel flow schedule for acceleration which is very conservative with respect to permissible engine operating temperature in order to avoid the compressor stall region. Various means have been devised to enrich the fuel supply after the engine reaches a rotational speed where the danger of going into compressor stall is no longer present. This type of schedule leaves much to be desired, inasmuch as there is a very significant speed range below the surge or stall region wherein much greater acceleration would be permissible if engine operating temperature were the only limitation. It has also been found that production engines vary considerably in their ability to absorb fuel without going into the stall arear; therefore, production fuel control systems which rely upon scheduling of fuel flow to a predetermined pattern must be overly conservative for many engines. In attempting to meet this problem, it has been determined that if the engine is limited to acceleration at a uniform value, a value can be selected which will permit the engine to skirt very close to the compressor stall area. If means are provided for scheduling fuel to the engine in an amount approximately equal to that which is required to produce a maximum permissible operating temperature over most of the acceleration range of the engine and an overriding control is provided for the surge region based upon a uniform acceleration value, a very considerable improvement in acceleration time will result. This general theory of operation is discussed in copending application Serial No. 473,108, now Patent No. 2,971,338 filed December 6, 1954, in the name of Rudolph Bodemuller (common assignee). It is an object of the present application to incorporate an electrical acceleration limiting system similar to that shown generally in said application in a fuel control system utilizing a production type of hydro-mechanical scheduling control.

It is another object of the present invention to provide an electrical acceleration limiting device operable to reduce the pressure drop across the main metering valve of a hydro-mechanical fuel system over the portion of the acceleration range where compressor stall may be encountered.

It is another object of the present invention to provide an electrical acceleration limiting means to be positioned downstream of a regular hydro-mechanical fuel control system which is capable of by-passing excess fuel passed by the hydro-mechanical fuel control over the portion of the acceleration schedule where compressor stall may be encountered.

It is another object of the present invention to provide a fuel control system including a hydro-mechanical scheduling structure whereby an electrical acceleration limiting means is provided for limiting fuel flow around the acceleration range where compressor stall may be encountered, said electrical means being easily adjustable for changes in acceleration limits.

It is another object to provide a control system utilizing well-known hydro-mechanical fuel scheduling means in which a parameter other than fuel flow is used to prevent compressor stall.

It is a further object of the present invention to provide a fuel control system for gas turbine engines in which acceleration fuel flow is limited by scheduling means over the portion of the acceleration range where operating temperatures are the most severe limiting factor and by an overriding closed loop limiting system responsive to acceleraiton over the portion of the acceleration schedule where compressor stall may be encountered.

Other objects and advantages will become apparent from the following specification take in connection with the accompanying drawings, in which:

FIGURE 1 is a schematic drawing of our electrical acceleration limiting system used in conjunction with a hydro-mechanical fuel control system shown in cross-section wherein the limiting system acts to curtail fuel flow by reducing the pressure drop across the main metering valve; and FIGURE 2 is a schematic drawing showing our control placed downstream of the main metering structure of a hydro-mechanical fuel control system wherein our electrical system acts to by-pass sufficient fuel to limit acceleration to a referenced value.

In FIGURE 1 is shown a gas turbine engine 10 having a manifold 12 for supplying fuel to said engine. A fuel conduit 14 conducts fuel to the manifold 12 from a hydro-mechanical fuel control shown generally at numeral 16. Driven by the engine 10 is an alternating current tachometer 18 which supplies an alternating current varying with voltage and frequency to an acceleration circuit, shown generally at 20, an acceleration reference circuit, shown generally at numeral 22, and to an amplifier 24. The output of amplifier 24 is supplied to either a winding 26 or a winding 28 of a torque motor 30. The torque motor shaft 32 controls the position of a valve 34 which controls communication between a pair of conduits 36 and 38 connected to the main fuel control unit 16.

In the main fuel control unit 16 are shown a pair of chambers 40 and 42 divided by a metering head diaphragm 44. A regulator valve 46, provided with a series of ports 48, is connected to the diaphragm 44. The regulator valve is hollow and slidable within a casing 50. Fuel is delivered to the regulator valve from a source, not shown, by way of a conduit 52, and a chamber 54. A fuel pump 55 supplies the fuel to chamber 54, said fuel being maintained at a predetermined pressure value through the action of a by-pass valve 56 which operates in the conventional manner, by-passing fuel to the inlet side of the pump when the pressure in chamber 54 exceeds said predetermined value. A metering valve 58 is slidably mounted in a valve body 60 having a hollow tubular section 62, the valve being provided with openings 64 adapted to register with coacting openings 66 in the valve body. Fuel at $P_2$ pressure in chamber 40 flows into the tubular extension 62 and thence through metering restrictions 64 and 66 to an annular metered fuel chamber 70. From the latter chamber, fuel flows across a cut-off valve 72 and then by way of conduit 74 to conduit 14.

The metering valve 58 is of the all-speed governor type; it is provided with a governor spring 76 which may be selectively set by the pilot through suitable linkage including lever 78 and associated members. An adjustable stop 80 limits valve 58 to a minimum flow position when closed. The right-hand end of the stem of valve 58 acts to reset a pair of governor weights 81 (only one of which is shown) mounted to rotate with an engine driven governor shaft 82. When the selected speed is reached, the governor weights balance the governor spring and an equilibrium condition is attained, whereupon the engine will operate at a substantially constant speed for the particular setting of the pilot's control lever.

The regulator valve 46 is positioned automatically as a function of engine speed and will maintain the fuel head across the metering valve 58 within predetermined upper and lower limits of temperature. In the example illustrated, this is accomplished by applying the thrust exerted by a pair of centrifugal weights 83 (only one of which is shown) to the regulator valve 46 and its coacting diaphragm 44. The weights 83, however, act independently of the weights 81. Thus, while the weights 81 act on the inner end of the stem of the metering valve 58, the weights 83 act on a sliding sleeve 84 having a driving connection with the shaft 82, said sleeve in turn having an operating connection with the upper end of a lever 85, the latter being fulcrumed at 86 and at its lower end being forked and contacting a thrust bearing 87 mounted on the stem of the regulator valve 46. As the speed of the engine driven shaft 82 increases, the weights 83 move radially outward and exert a force on the regulator valve 46 in a direction tending to open the latter; this force is opposed, however, by fuel pressure acting on the diaphragm 44 in a direction tending to close said valve, the resultant differential being proportional to the square of engine speed. This differential is proportional to that imposed across the metering valve 58, and for any given position of the latter valve (assuming constant density) the velocity and hence the fuel flow across the metering restrictions 64, 66 will be proportional to the square root of this differential or to engine speed directly.

An adjustable stop 88 determines the maximum open position of the regulator valve 46, while a spring 89 acting on the diaphragm 44 determines the minimum metering head at engine speeds which may be so low as to produce instability in the regulator system.

Since the supply of air will not only vary with engine speed, but also with changes in density due to changes in pressure and temperature and aircraft speed (ram pressure), a density compensating circuit is provided. This consists of a contoured needle 91 which controls an orifice 93 in series with one or more fixed control jets 95, communicating chamber 40 with chamber 42 across the regulator diaphragm 44. From chamber 42, fuel may flow to the metered fuel ($P_4$ pressure) chamber 70 by way of passage 97, valve chamber 99, orifice 93 and passage 101. The density needle 91 is mounted to slide in a sealed bearing 103 and at its lower end has an operating connection with an arm or lever 105 secured to the adjacent end of a shaft 107, the opposite end of said shaft having an operating connection with a density responsive spring loaded capsule 109 by means of an arm or lever 111 and a rod 112. The bellows or capsule 109 is mounted in a housing 113 vented at 115, the unit as a whole being located where it will be exposed to changes in pressure and temperature of the air flowing to the compressor.

The fuel regulator and its interrelated density compensating circuit operate as follows:

The fuel pressure differential across the regulator diaphragm 44 at a given governor setting and constant density, is substantially equal to and balances the force set up by the centrifugal head generating weights 83; it is proportional to the square of engine speed and will vary with engine speed. If at a given engine speed the metering valve 58 is repositioned, the regulator valve 46 will also be repositioned due to the fact that the regulator differential will be out of balance with the differential across the metering valve. As the metering valve 58 opens or closes to maintin the speed selected by the setting of the governor, the regulator valve 46 opens or closes to maintain the fuel head or pressure differential across the valve 58 in accordance with the particular speed at which the engine is operating.

The density control circuit or passageway consisting of the control jets 95, chamber 42, passage 97, valve chamber 99 and passage 101 is in parallel with the main flow passage across the metering valve by way of chamber 40 and metering restrictions 64 and 66. All flow through the density circuit must pass through the control jets 95 and variable orifice 93 controlled by needle 91. Since at a given engine speed the differential across the regulator diaphragm remains constant, the flow through the fixed jets 95 will also remain constant, and the drop across the variable orifice 93 at a constant flow will vary inversely as the square of its area, and for a given position of needle 91 (constant density) the drop across orifice 93 will be proportional to the drop across the jets 95. The sum of the drop across the orifice 93 and the drop across the jets 95 is equal to the drop across the metering valve 58, and at any fixed position of needle 91, the total pressure drop will be substantially proportional to the square of engine speed.

Any variation in compressor inlet pressure and/or temperature will vary the position of the needle 91. Should there be a drop in entering air density, the bellows or capsule 109 will expand and move needle 91 downwardly, thereby increasing the area of orifice 93 and reducing the drop or pressure differential across said orifice. This increases the $P_2$—$P_3$ differential across the regulator diaphragm 44 at the then existing speed and throws the differential out of balance with the centrifugal head generating weights 83, whereupon the regulator valve 46 moves toward closed position and the rate of fuel feed and hence engine speed is reduced to a point where the differential is again in balance with the said weights. Should there be an increase in entering air density, the foregoing sequence of operations will be reversed. It will thus be seen that the density circuit senses the pressure differential across the metering valve in order to correct the position of the regulator valve for variations in compressor inlet air pressure and temperature. Also, at any given engine speed as determined by the setting of the governor, the position of the valve 58 will remain substantially constant irrespective of changes in entering air density, but fuel flow will still vary in relation to such changes due to variation in the fuel metering head.

It will be recognized that the fuel flow provided by the above described unit is established by calibration of a number of components, none of which is easily changed or adjusted to take care of individual differences in engines. Such a control must, therefore, meter fuel to a very conservative schedule, in order to avoid the compressor stall area. This flow can be made to much more closely approach a maximum temperature line if provision is made for imposing an overriding signal over the compressor stall region. This is accomplished in the version shown in FIGURE 1 by reducing the pressure drop across the metering valve 58. It will be observed that chamber 70 contains meter fuel pressure which has been referred to as pressure $P_4$ and that conduit 38 is in communication with this chamber. Similarly, conduit 36 is in communication with chamber 42 which contains $P_3$ or density compensating fuel pressure. Communication between conduits 36 and 38 is normally blocked by means of valve 34; however, over the region where compressor stall may be encountered valve 34 is moved axially and $P_3$ pressure is permitted to bleed into conduit 38. As $P_3$ pressure is reduced in chamber 42, the diaphragm 44 is caused to move to the left thus pulling valve 46 to the left also and reducing its metering area. This allows less fuel to be supplied to chamber 40 and therefore the $P_2$—$P_4$ pressure or the pressure across the metering valve 58 is reduced.

Valve 34 is actuated by our electrical limiting system which operates as follows: an alternating current signal from tachometer 18 is supplied to each of two banks of rectifiers 120, 122 in circuits 20 and 22, respectively. The output of rectifier bank 120 is impressed across a resistor 124 (whose purpose it is to provide a desired time constant for the system) and a filter capacitor 126. The signal appearing at points A and B in this circuit is a D.C. voltage having a magnitude directly proportional to engine rotational speed. This signal is supplied across an additional capacitor 128 which provides a differentiating function, converting the D.C. signal to a signal proportional to rate of change of speed or engine acceleration. This signal is supplied to amplifier 24 which may be one of any of several well-known amplifier designs. A magnetic amplifier for this purpose could be one similar to that shown in application Serial No. 367,045, now Patent No. 2,841,336, filed July 6, 1953, in the name of Lyle Martin (common assignee). The output of rectifier bridge 122 is applied across a filtering circuit consisting of resistors 130 and 132 and a pair of semi-conductor diodes 134 and 136. The output of this circuit is a smooth direct current signal and is impressed across an additional dropping resistor 138 before being impressed across a potentiometer 140. The direct current voltage as measured from point C to point D is directly proportional to a desired acceleration value. The slider of potentiometer 140 is connected through a mechanical linkage to an aneroid member 142 which corrects this reference for changes in density conditions. The output of this circuit is also supplied to amplifier 24 where it is compared with the rate of change or acceleration signal provided by circuit 20. As a result of this comparison in amplifier 24, an acceleration error signal is supplied to either winding 26 or winding 28 of the torque motor 30. If the acceleration is below the reference value, the signal supplied to the torque motor will be such as to hold valve 34 closed against its seat; however, if the acceleration is above the reference value, the signal supplied to the torque motor will cause the torque motor armature to pull valve member 34 away from its seat and pressure $P_3$ will be bled into conduit 38.

The system above described will operate along a schedule which roughly coincides with the maximum temperature line until the requested acceleration value is exceeded, at which time the acceleration limiter will override the previous schedule and limit the fuel flow until the engine approaches maximum speed. On many engines this will result in an appreciable loss in acceleration because there is a range of speeds above the surge or stall region over which this acceleration limit will be a much more severe limitation than is maximum allowable temperature. For this reason, it is desirable to provide some means for allowing a rapid increase in acceleration above a certain speed value. This is done in our system as follows:

As previously indicated, the voltage measured from point A to point B of circuit 20 is a direct current voltage directly proportional to engine speed. This voltage is supplied to a comparing circuit 144 where it is compared with a reference voltage directly proportional to a certain desired speed value. This reference voltage may be obtained by conventional voltage dividing means. The output of this comparing circuit, which will be a speed error signal and which has a polarity depending upon whether the speed signal is greater or less than the speed reference signal, is supplied to amplifier 24. Speed error signals indicative of speed above the reference established in comparing circuit 144 will act in amplifier 24 to override the acceleration error signal and cause the amplifier to supply the torque motor 30 with a signal tending to close valve 34. As this valve is closed, the hydromechanical fuel control unit 16 will then act to increase the fuel flow up to a value approximating a maximum operating temperature line.

The device of FIGURE 2 is very similar to that of FIGURE 1, and all components which are, or may be, identical are given the same numbers. In this structure, however, the acceleration limiting means consists of a valve 150 in a metered fuel line downstream of the main fuel control 16. This valve acts to by-pass metered fuel through a conduit 152, a head regulator 154 and an additional conduit 156 back to the inlet side of a pump 158. Fuel not by-passed is supplied through a conduit 14 to a manifold 12 of the engine 10 as before. A tachometer 18 driven by the engine 10 operates an electrical system identical with that previously described with one exception which will be set forth below. In the case of this system the torque motor 30 acts to move a shaft 160 having positioned thereon a number of lands or spools which serve to direct fluid flow through a hydraulic servo motor 162. Fluid is supplied at high pressure through a conduit 164 to the servo motor 162 and, depending on the position of the spools on shaft 160, will flow through either conduit 166 to a chamber 170, or a conduit 168 to a chamber 172 on each side of a power piston 174. As piston 174 moves it carries with it a shaft 176 upon which are positioned the movable members of valve 150. The structure of FIGURE 2 does not contain the inherent stabilization of that of FIGURE 1; therefore, a rate generator 178 has been attached to the end of shaft 176, this generator being so constructed that it will generate a voltage proportional to the rate of movement of shaft 176. The output of rate generator 178 is supplied to amplifier 24 and provides a necessary stabilization function. A workable generator for this purpose is described in co-pending application Serial No. 389,293, now Patent No. 2,842,688, filed October 30, 1953 (common assignee).

The head regulator 154 operates in the conventional manner to regulate the head across the entire system. It will be seen that a movable member 180 is spring-loaded toward a closed position by means of a spring 182 and on one side communicates through a conduit 184 with metered fuel pressure downstream of the by-pass structure and on the other side through conduit 156 to pump inlet pressure.

Although only two embodiments are shown and described herein, it will be obvious to those skilled in the art that various changes in arrangement of parts and design of components may be made without departing from the spirit of the invention.

We claim:

1. A fuel control system for a gas turbine engine, said system having a metering valve and a hydro-mechanical fuel scheduling means including a pump for controlling the flow across said valve, a tachometer for producing an alternating current signal varying in voltage and frequency with the speed of said engine, rectifying and filtering means for converting said signal to a direct current voltage varying with speed, means including a capacitor for differentiating said direct current voltage to produce a signal proportional to engine acceleration, a circuit producing an acceleration reference signal including a voltage divider and means for varying the output of said circuit with changes in altitude conditions, an amplifier including means comparing said acceleration reference signal with said acceleration signal to produce an acceleration error signal, electro-responsive means driven by the output of said amplifier, and means responsive to movement of said electro-responsive means for limiting the flow output of said system during acceleration over the portion of the speed range where compressor stall is encountered.

2. A fuel control system as set forth in claim 1 wherein said hydromechanical scheduling means includes a metered fuel pressure chamber downstream of said valve, and a chamber containing a density compensating device for varying a fluid pressure upstream of said metering valve, and said last named means includes a conduit connecting said metered fuel pressure chamber with said last named chamber, and a valve in said conduit actuated by said electro-responsive means.

3. A fuel control system as set forth in claim 1 wherein said last named means includes a valve actuated by said electro-responsive means for varying the pressure drop across said metering valve.

4. A fuel control system as set forth in claim 1 wherein said last named means includes a servo-motor actuated by said electro-responsive means, a power piston actuated by said servo-motor, a shaft carried by said piston, valve means positioned on said shaft for controlling by-pass flow from the downstream side of said metering valve to the inlet side of said pump, a generator responsive to movement of said shaft for generating a signal proportional to rate of change of movement of said shaft, and means conducting said signal to said amplifier to provide a stabilizing function.

5. A fuel control system as set forth in claim 1 wherein said last named means includes a servo-motor actuated by said electro-responsive means and a valve controlled by said servo valve for controlling by-pass flow from the downstream side of said metering valve to the inlet side of said pump.

6. A fuel control as set forth in claim 1 wherein said last named means includes a valve actuated by said electro-responsive means for by-passing fluid from the downstream side of said metering valve to the inlet side of said pump.

7. A fuel control system for a gas turbine engine, said system having a metering valve and a hydro-mechanical fuel scheduling means including an all-speed governor for controlling the flow across said valve, a tachometer for producing an alternating current signal varying in frequency with the speed of said engine, means for converting said signal to a direct current signal of voltage proportional to speed, means comparing said speed signal with a reference to produce a speed error signal, means for differentiating said speed signal to produce a voltage proportional to rate of change of speed, means for producing a signal proportional to a desired rate of change of speed and for comparing said signal with said voltage proportional to rate of change of speed to produce a speed rate error signal, electro-responsive means connected to receive said speed rate error signal or said speed error signal, and means responsive to movement of said electro-responsive means for limiting the flow output of said system over the portion of the acceleration range where compressor stall is encountered.

8. A fuel control system as set forth in claim 7 wherein said hydro-mechanical scheduling means includes a metered fuel pressure chamber downstream of said valve, and a chamber containing a density compensating device for varying a fluid pressure upstream of said metering valve, and said last named means includes a conduit connecting said metered fuel pressure chamber with said last named chamber, and a valve in said conduit actuated by said electro-responsive means.

9. A fuel control system as set forth in claim 7 wherein said last named means includes a valve actuated by said electro-responsive means for varying the pressure drop across said metering valve.

10. A fuel control system as set forth in claim 7 wherein said last named means includes a servo-motor actuated by said electro-responsive means, a power piston actuated by said servo-motor, a shaft carried by said piston, valve means positioned on said shaft for controlling by-pass flow from the downstream side of said metering valve to the inlet side of said pump, a generator responsive to movement of said shaft for generating a signal proportional to rate of change of movement of said shaft, and means conducting said signal to said amplifier to provide a stabilizing function.

11. A fuel control system as set forth in claim 7 wherein said last named means includes a servo-motor actuated by said electro-responsive means, and a valve controlled by said servo valve for controlling by-pass flow from the downstream side of said metering valve to the inlet side of said pump.

12. A fuel control system as set forth in claim 7 wherein said last named means includes a valve actuated by said electro-responsive means for by-passing fluid from the downstream side of said metering valve to the inlet side of said pump.

13. A fuel control system for an engine, said system having a metering valve and hydro-mechanical fuel means including an all-speed governor for controlling the flow across said valve, means producing a voltage proportional to engine rotational speed, means comparing said voltage with a reference to produce a speed error signal, means for differentiating said voltage to produce a voltage proportional to acceleration of said engine, a voltage dividing circuit for producing a reference signal proportional to a desired acceleration value, means comparing said acceleration and acceleration reference signals to produce an acceleration error signal, an electro-responsive device connected to receive said speed error signal or said acceleration error signal, and means responsive to movement of said electro-responsive device for limiting the flow output of said system over a portion of the acceleration range of said engine.

14. A fuel control system as set forth in claim 13 wherein said hydro-mechanical scheduling means includes a metered fuel pressure chamber downstream of said valve, and a chamber containing a density compensating device for varying a fluid pressure upstream of said metering valve, and said last named means includes a conduit connecting said metered fuel pressure chamber with said last named chamber, and a valve in said conduit actuated by said electro-responsive means.

15. A fuel control system as set forth in claim 13 wherein said last named means includes a valve actuated by said electro-responsive means for varying the pressure drop across said metering valve.

16. A fuel control system as set forth in claim 13 wherein said last named means includes a servo-motor actuated by said electro-responsive means, a power piston actuated by said servo-motor, a shaft carried by said piston, valve means positioned on said shaft for controlling by-pass flow from the downstream side of said metering valve to the inlet side of said pump, a generator responsive to movement of said shaft for generating a signal proportional to rate of change of movement of said shaft, and means conducting said signal to said amplifier to provide a stabilizing function.

17. A fuel control system as set forth in claim 13 wherein said last named means includes a servo-motor actuated by said electro-responsive means and a valve controlled by said servo valve for controlling by-pass flow from the downstream side of said metering valve to the inlet side of said pump.

18. A fuel control as set forth in claim 13 wherein said last named means includes a valve actuated by said electro-responsive means for by-passing fluid from the downstream side of said metering valve to the inlet side of said pump.

References Cited in the file of this patent

UNITED STATES PATENTS

| | | |
|---|---|---|
| 2,492,472 | Fortescue | Dec. 27, 1949 |
| 2,628,472 | Dray et al. | Feb. 17, 1953 |
| 2,662,372 | Offner | Dec. 15, 1953 |
| 2,720,751 | Kunz | Oct. 18, 1955 |
| 2,762,194 | Kunz | Sept. 11, 1956 |